Figure 3:
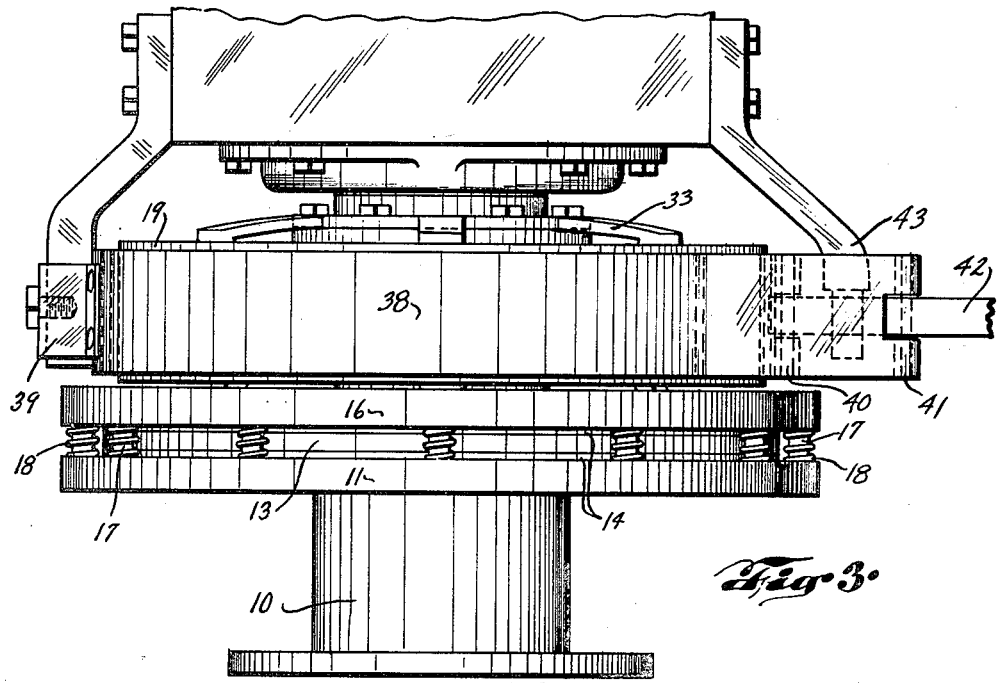

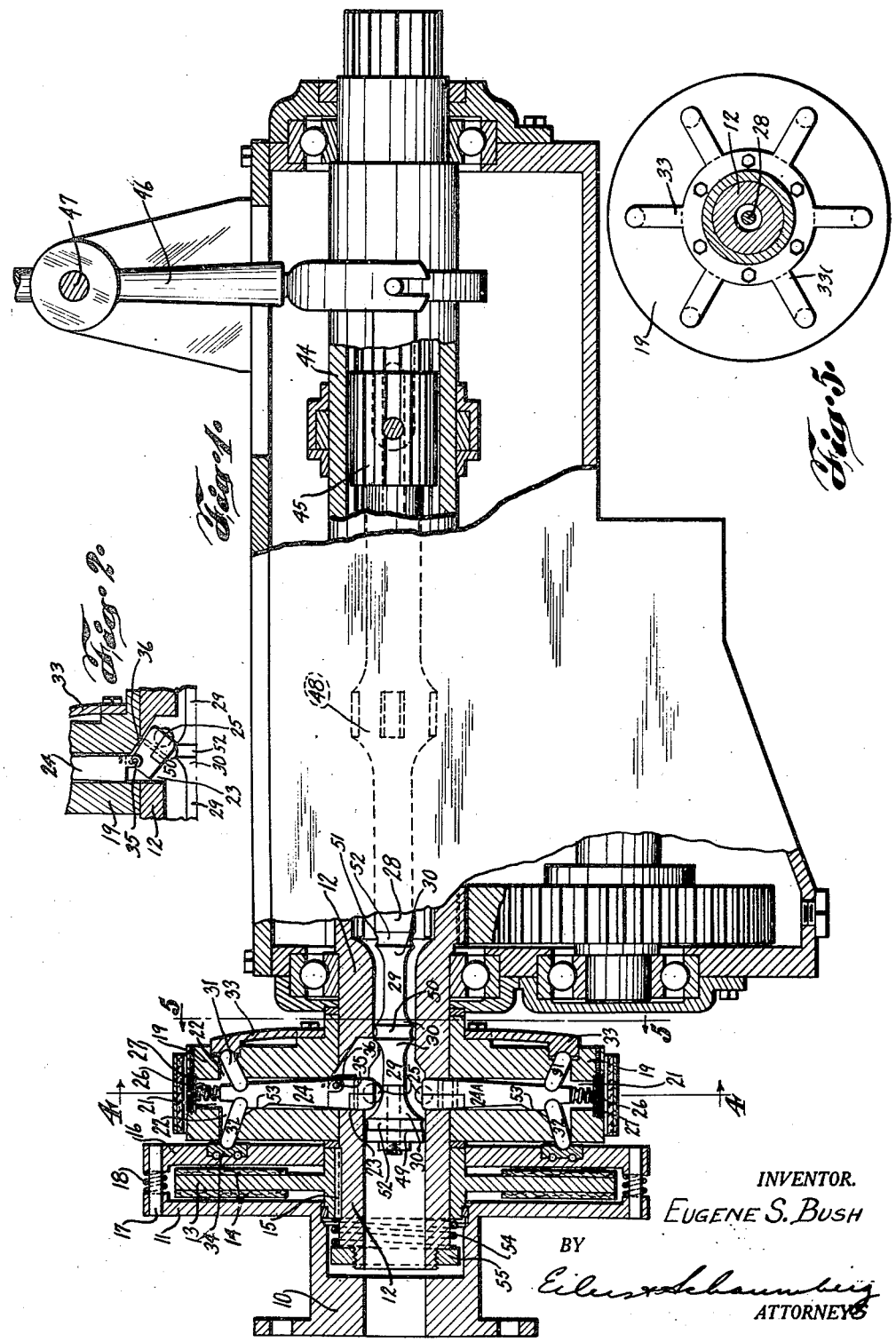

Sept. 1, 1936.  E. S. BUSH  2,053,020
CLUTCH MECHANISM
Filed Dec. 2, 1931   2 Sheets-Sheet 2

INVENTOR.
EUGENE S. BUSH
BY
Eilers Schaumberg
ATTORNEYS

Patented Sept. 1, 1936

2,053,020

UNITED STATES PATENT OFFICE 2,053,020

CLUTCH MECHANISM

Eugene S. Bush, St. Louis, Mo., assignor to Bush Manufacturing Company, St. Louis, Mo., a corporation of Missouri Application December 2, 1931, Serial No. 578,509

21 Claims. (Cl. 192—68)

This invention relates to improvements in clutch mechanism, and more particularly to a clutch and actuating means therefor, of a type particularly adapted for actuation coordinately or sequentially with the speed change movements of an associated transmission, for example in a clutch and transmission assembly for automotive use. The present invention constitutes a continuation in part, of my copending application Serial No. 514,953, filed February 11, 1931.

To the end of minimizing and simplifying the number of separate control operations incident to the control of motor vehicles, it is desirable to provide for the actuation of a clutch mechanism between its engaged and disengaged positions, solely by movement of a manual control member such as may be normally employed for effecting changes in gear ratio. It is for the purpose of providing an improved clutch assembly adapted for such a control arrangement, that the present invention is particularly directed.

Among the objects of the present invention, there may be noted the provision of a clutch assembly which may be actuated between engaged and disengaged positions by movement of a control member, axially of the rotating parts of the assembly, and whereby the clutch is adapted for actuation in predetermined sequence with an axially movable shifting member or speed change element of an associated transmission.

Another object of the invention is attained in a clutch including a control mechanism so arranged as to provide a predetermined sequence of clutch-actuating movements, upon a predetermined unidirectional movement of a clutch control member.

A further object of the invention is attained in a control mechanism for translating a unidirectional control movement to produce a predetermined sequence of clutch actuating movements, and to produce a different sequence of such movements responsively to movement of the control in an opposite direction.

An additional object of the invention is attained in a clutch assembly adapted for actuation through the use of a novel arrangement of radially movable plungers disposed to be operated by a member movable axially of the rotating parts of the clutch assembly.

A further object of the invention is attained in a clutch assembly, and actuating means therefor, of minimum overall dimensions, and particularly of minimum overall length, as compared with prevailing devices.

A still further object of the invention is attained in a clutch assembly and actuating means therefor, in which the clutch operating elements are, or may be, entirely enclosed, and thus concealed and protected from dirt and foreign matter.

Yet another object of the invention is attained in provisions whereby the clutch may be actuated between in and out positions with a minimum range of movement of a manually controlled clutch-actuating member.

Figure 4:
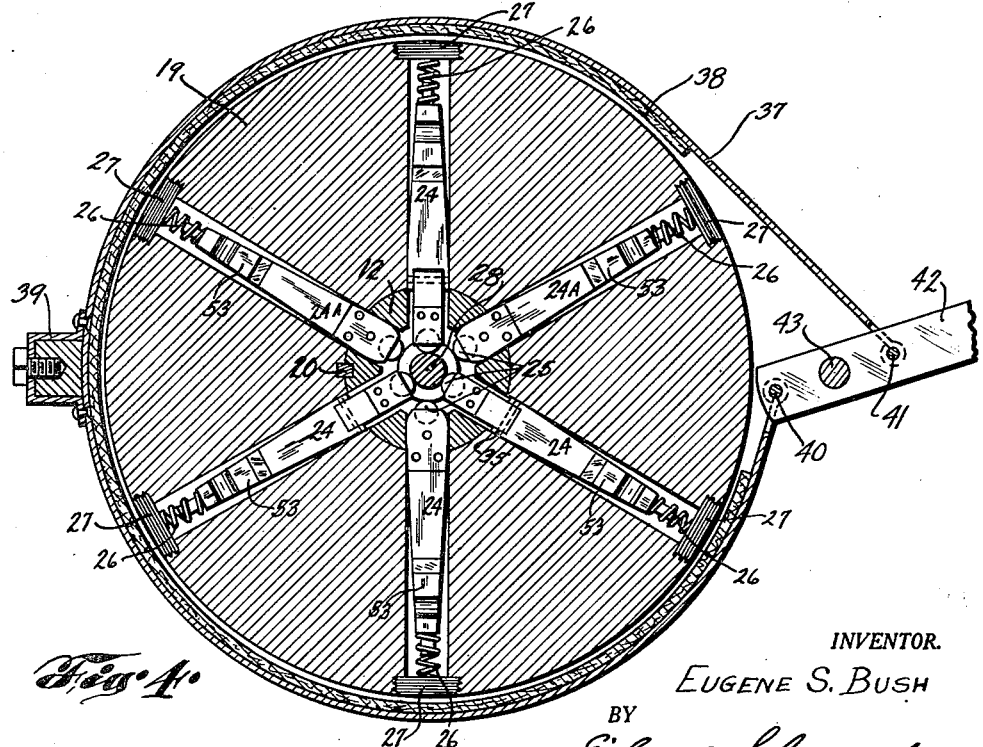

Further objects and advantages of the invention will appear as the description proceeds, and from the accompanying drawings of a preferred embodiment of the invention, and in which:

Fig. 1 is a vertical sectional elevation of a clutch and a portion of a transmission assembly constructed according to the present invention; Fig. 2 is a fragmentary radial section; showing a hinge action of certain clutch-actuating parts; Fig. 3 is a top or plan view of the clutch assembly appearing in section in Fig. 1; Fig. 4 is a section along line 4—4 of Fig. 1, and Fig. 5 is a sectional elevation as viewed from line 5—5 of Fig. 1.

As illustrated in Fig. 1, the clutch of the present invention preferably utilizes a hollow hub or head 10, constituting also, by preference as an integral part, a clutch plate 11, this being one of the driving members of the clutch. The assembly presently described includes a hollow driven shaft 12, near one or the outer end of which is a driven plate or element shown at 13, the outer faces of which are provided with suitable friction facings 14. The clutch member 13, is splined, or may be otherwise secured to the end of the shaft 12, as by a spline or key 15. A member 16, in the nature of a companion element to the member 11, is preferably carried by the inner end of the hub portion of the member 13, as shown. Carried by preference peripherally of the element 11, are a plurality of pins 17, preferably affixed within the outer rim portion of the element 11 and slidably engaging registering apertures in the rim of the member 16. A plurality of coil springs 18, each carried by one of the pins 17, tend to move the plate 16 to the right (Fig. 1), and thus tend normally to urge the elements 11 and 16 away from each other, away from the plate 13, and in a direction to cause disengagement of the clutch.

The clutch actuating mechanism of the example described includes, and is substantially contained within, a drum member 19, keyed as by a locking member 20, to the shaft 12. The member 19 is provided with a plurality, preferably six, radial well portions 21 for a purpose hereinafter appearing, the wells 21 each being transversely intersected by a passage 22. As best appears in Fig.

1, each of the wells 21 continues inwardly to a registering aperture 23, in the shaft 12.

In each of the wells 21 is disposed, for radial movement, a plunger 24 or 24A, the inner end of which may be formed of separable hollowed portions suitably secured together so as to form a pocket at this portion of the plunger, for the reception of a ball bearing or the like 25. At the outer end of each of the plungers is a reduced end portion forming a pin and shoulder for receiving a coiled compression spring 26. The coil springs are kept in position as by threaded plugs 27, each serving as a closure for the outer end of the associated well 21.

It will appear from the foregoing that each of the plungers 24 and 24A, through the bearing member such as 25, is adapted for radial actuation upon certain movements of an endwise movable operating member 28. The member 28, as appears from the drawing, is provided with one or more portions of relatively reduced diameter, 29, and with bevel or cam faces 30 grading between the portions of different diameter, the cam faces being connected by suitable hub portions, hereinafter designated, which coact with the cam faces operatively to actuate the inner end of the grouped plungers 24—24A, when the member 28 is shifted along its axis, as will presently be more fully described.

Each of the transverse passages 22 serves to contain, by preference, a pair of toggle levers 31 and 32, arranged on opposite sides of the coacting plunger. As best appears from Fig. 1, the adjacent or innermost ends of the toggle members 31 and 32 are laterally recessed in the plunger, and thus are in pivoted bearing relation therewith. The outer end of the lever or toggle member 31 engages a spring loaded or resilient portion 33, constituting also a closure for the transverse passage 22. The resilient elements 33 may consist of individual pieces of flat spring material or, as preferred and illustrated, may consist of spring fingers formed integrally with and disposed radially of a single tempered disc secured to one face of the member 19. In either case, the resilient structure 33 should be of a relatively stiff material or heavily loaded, the spring elements thereof serving the purpose of equalizing the pressure exerted by the toggle arms on the clutch, irrespective of any variation in thickness of the clutch facings due, for example, to wear thereof in service. The housing member 19 may conveniently be shouldered, as shown in Fig. 1, to receive a central annular portion of the member 33 which may be detachably secured to the housing by screws or the like. The terminals of the finger portions are each preferably provided with a transverse groove forming a seat for the engaging end of the adjacent toggle arm, and thus tending to position such arm within its intended range of movement. The outer end of the toggle lever 32, is adapted to be selectively extended from the passage into engagement with a wearing ring 34, disposed, by preference, in a suitable annular recess in the outer face of the plate 16. Since it is desirable to provide for relative rotation between the ring 34 and plate 16, ball bearings or the like, may, as desired, be disposed, as shown, between the ring and plate.

As seen in Figs. 1, 2 and 4, the plungers 24A are of rigid construction, all of the plungers of this type being adapted for conjoint actuation and the plungers of this group being appreciably shorter than the plungers 24 of a different group. The plungers 24 are intermediately hinged as at 35 in such a manner that the lower end of each of the plungers of this group may be swung rearwardly about their hinges, as seen in Fig. 2, upon certain movements of the member 28 to the right (Figs. 1 and 2) and for a purpose hereinafter more fully appearing. This hinging movement is opposed by a suitable spring, such as a small leaf spring 36, which tends to maintain the hinged portions of each of the plungers 24, in alignment.

As will clearly appear from Fig. 4, the threaded caps 27 are recessed below the cylindrical surface of the drum 19, and the periphery of the drum member otherwise kept free of projections, so as to enable its utilization as a brake drum. This purpose is accomplished by the provision of a flexible contracting band 37 provided with a friction lining 38, the band being supported intermediate its ends as through a yoke 39, or the equivalent. The opposite ends of the band 37 may be pivoted as at 40 and 41, to a brake actuating arm 42, provided with a fixed pivot 43, and arranged for actuation by a pedal or hand lever, as may be desired.

To provide a clear understanding of the use and application of the clutch of the present invention in connection with a transmission assembly of the general type described in detail in my copending application, above noted, it will appear that an internally splined shaft 44 having a hollow end portion, may constitute the power take-off element, such as the propeller shaft of an automotive vehicle. The adjacent end of the shaft 28 may be correspondingly externally splined as at 45, to engage, in actuating relation, the shaft 44, the shaft 28 being endwise movable with respect to the shaft 44. The movement of a manually operable speed change lever 46, about its pivot 47, serves to control the endwise movement of the shaft 28. Preferably at an intermediate portion of the shaft member 28, is disposed a driving head or clutch portion 48. It is sufficient for purposes of the present description to indicate that the head 48 is movable into and out of coacting seat portions, one of which is located in the shaft 12, and others of which are located in certain of the gears of the transmission including certain of the forward gears and a reverse gear, in such a manner that endwise movement of the shaft 28 serves selectively to interconnect in driving relation the gearing elements of the transmission to enable the desired changes in gear ratio.

There are provided, in the example illustrated, three clutch-actuating hub portions. One of these, a hub 49, may be formed as a separate element and secured as by a threaded member to the end of the shaft 28. Hub portions 50 and 51 are of somewhat smaller diameter than the hub 49 and are, by preference, formed integrally with shaft 28 as a part thereof. Each of the hub portions 49, 50 and 51 is preferably provided with a centrally located peripheral groove 52 adapted, as the hub is brought into the plane of the plungers and into actuating engagement with one group thereof such as 24 or 24A, to enable the bearing ends of such plungers to seat within the groove, and thus tending to maintain the shaft 28 in predetermined axial position while permitting the shaft to rotate. In the present example the spacing between centers of hubs 49, 50 and 51, conforms to the spacing between centers of the seats for clutch head 48, located respectively in a reverse, first speed, and a higher speed gear, the device as shown being arranged for use with a transmission of so called two speed forward and one reverse type. It may here be noted that the gear clutch head 48, or the seats which it selectively engages, are, by preference, provided with yieldably disposed engaging members, so that the head 48 is movable freely at all times into or through its several gear-engaging positions, so that neither the shifting movement nor the clutch actuating movement of shaft 28 offers any appreciable resistance, at any time, to a free movement of the shifting lever 46, all of which will more fully appear in my copending application above noted.

The operation of the assembly as described, particularly the clutch and clutch-actuating mechanism, is thought to be apparent from the preceding detailed description of its parts, but may be briefly reviewed, for sake of completeness, as follows:

When the parts of the device are positioned as shown in Fig. 1, the axially movable shaft 28 occupies a so-called neutral position, in which the gear clutch head 48 is out of engagement with any of the gears of the transmission, and in which a portion of reduced diameter of the shaft 28, is in the plane of the plungers 24 and 24A, and thus the clutch is disengaged. It will appear that each of the plungers 24 and 24A is radially retracted under the influence of the associated spring 26, under these conditions. Outward radial movement of all of the plungers of one group is concurrently effected when the member 28 is moved, say to the left (Fig. 1) so as to bring the hub portion 50 into engagement with the inner ends of this group of plungers. This results in an outward radial movement of each plunger 24, and since the outer end of the toggle arm 31 is opposed by the spring member 33, there results an oscillating movement of the plunger and associated paired toggle levers, toward the clutch plates, this outward radial movement of the plungers serving substantially to center the toggle arms 31 and 32. It may be desired under certain conditions to insure that the plungers will not be oscillated into clutch-engaging position prior to their endwise, outward movement by one of the hub portions of shaft 28. To this end there may be provided, on each plunger, a projection or cam 53, serving to prevent movement of the plunger to the left (Fig. 1), except when the cam enters the transverse passageway as the plunger is moved outwardly to effect clutch engagement. It will have appeared that this outward movement of the plungers results in an endwise or axial displacement of the clutch plate 16 toward the plate 13. The plate 13 is, in turn, susceptible of a certain endwise movement sufficient to bring it into frictional driven relation with the driving plate 11, although it is understood that in the present example, the plate 13 is so secured as to compel its rotation with the end of the hollow shaft 12. The slight endwise movement of the member 13, above referred to, is opposed, not only by the springs 18, but also by a spring 54, preferably a coiled compression spring carried at the outer end of shaft 12, and kept in place as by a nut 55, engaging the end of the hollow shaft.

It will thus appear that movement of the plungers 24 or 24A, in a direction to cause engagement of the clutch, is opposed by the springs 26; that movement of the plates 11 and 13 toward each other is opposed by the springs 18, and that a movement of the plate 13 is, in like manner, against the loading of spring 54, with the result that the several springs 18, 26 and 54 all coact to move the clutch elements as well as certain of the actuating elements, toward clutch-disengaging position.

In an automatic clutch assembly of the present type there is desirably attained a predetermined sequence of clutch engaging and disengaging control movements as the speed change lever 46 is moved to effect, in order, a lower, followed by a higher gear ratio, each gear ratio change being automatically accompanied by the appropriate clutch actuating movements. However, in shifting in the reverse order, from higher to lower gear ratios, it is undesirable to effect a clutch-engaging movement as the speed change control members are moved through their intermediate gear engaging positions. To the end of avoiding this undesirable effect, one group of the plungers, viz., 24, are hinged as described; so that, for example, as the hub portion 50 is moved to the right (Fig. 1) through and beyond the plane of the plungers, (the plungers being at such time, in clutch disengaging position), this reverse movement of the shaft 28 and hub 50 will not result in engagement of the clutch at a time when engagement is not desired. Engagement at this time is prevented by swinging the inner end portion of each of the plungers 24, to the right, as appears in Fig. 2. When, however, the speed change lever 46 and shaft 28 cause the control shaft to be moved to its extreme position to the right (Fig. 1) so as to bring the hub 49 in the plane of the plungers, plungers 24 will still not be actuated, but their inner ends will remain hingedly deflected as shown in Fig. 2. Under such conditions, however, due to the fact that the hub 49 is of substantially greater diameter than the hubs 50 and 51, the hub 49 will serve to actuate radially and outwardly, the plungers 24A, again to cause engagement of the clutch. It is thus seen that the plungers of one group, viz., 24, serve automatically to actuate the clutch whenever shaft 28 and gear clutch head 48 bring the transmission into its forward speed driving positions, while the plungers 24A serve to actuate the clutch only when the speed change mechanism is moved into its reverse operating position.

It will appear from the foregoing that the clutch mechanism results in definite sequences of clutching movements which are automatically coordinated with the accompanying movements of a speed change control member, so as to obviate any necessity for the usual separate clutch control.

It will appear as an advantage that the several control elements of the assembly are all so related as to avoid an undesirable sudden engagement of the clutch elements; this advantage in design throughout being exemplified by cam portions 30, which are of graded diameter, and of substantial length, so as to prevent any abrupt or grabbing engagement of the clutch, as the controls are shifted through the several speed change positions. The relation of parts is preferably such, as in the example shown, that the driving head 48, will have been brought into driving relation with a selected gear of the transmission, in such manner as to effect operative relation of the transmission parts somewhat prior to the time when a full frictional driving relation is developed between the plates 11, 13 and 16.

It will appear that, in addition to providing a clutch assembly which is admirably adapted for automatic operation concurrently with speed change control movements, the tremendous leverage of actuation of the clutch parts, through the agency of plungers 24 and 24A and toggle members 31 and 32, enables the clutch to be actuated with scarcely any noticeable effort. Further distinct advantages appear in the small number of parts necessary to make up the clutch itself, as well as its actuating assembly.

While the invention has been described by making detailed and specific reference to a single preferred embodiment and application of the invention, the specification is to be understood solely in a descriptive and not in a limiting sense, since a number of changes may be made in the parts and their combinations, without departing from the full intended spirit and scope of the invention.

I claim:

1. A friction clutch assembly including a driving element, a driven element, a plurality of clutch actuating plungers disposed radially of the clutch elements, a carrier having passages therein adapted to contain and guide said plungers, a toggle associated with each plunger for engaging the driven clutch element, a hollow shaft arranged to be selectively driven through the said clutch elements, a member movable within the hollow shaft, adapted to engage and actuate said plungers in a direction to effect engagement of the clutch, the plungers and passages therefor being formed to permit a lateral movement of the plungers near one end of the passages, and a spring urging each plunger laterally of the passage therefor, toward the driven element.

2. In a clutch assembly of plate type, clutch actuating plungers, plate-shifting means associated with the plungers, a series of plunger-engaging elements, means for moving said elements successively into actuating engagement with said plungers, a retracting spring for each plunger, and separate spring means tending to bias each plunger directly toward one of the clutch plates.

3. In a clutch organization for use with mechanism embodying a control shaft movable progressively into successive control positions, means for coordinating control movements of the mechanism and clutch, including an axially movable extension of said shaft, clutch control elements, including plungers radially arranged in a plane transverse of the clutch axis, a series of spaced projections on said shaft extension, adapted to actuate said elements in a predetermined sequence of clutch engaging and disengaging movements as the extension is moved one way, and means carried by the plungers for preventing a reverse sequence of such movements as the extension is oppositely actuated.

4. A friction clutch assembly including a plurality of plates, a hollow shaft on which certain of said plates are mounted, a plurality of clutch actuating plungers disposed radially about said hollow shaft, control means adapted for movement in opposite directions within the hollow shaft, into and out of actuating engagement with said plungers in one direction, and a joint in each of said plungers, whereby the control means may be operated free of plunger-actuating engagement in the opposite direction.

5. A clutch assembly for use with mechanism embodying a control element movable progressively into successive control positions, the clutch assembly including a plurality of frictionally engageable elements, a driven shaft serving to carry the clutch elements, clutch actuating means including a plurality of radially disposed and operable members having their inner ends disposed near said shaft, a toggle linkage for translating radial movement of said members to an axial movement of the clutch elements, a clutch control member, adapted for actuation responsively to said control element, the member being movable axially of said shaft and provided with cam surfaces each adapted selectively to be brought into actuating engagement with the inner ends of said radially disposed members from either direction along said shaft, and means for determining cammed actuation of the radial members according to direction of approach of the cams thereto.

6. In an actuating assembly for friction clutches including plate-type friction elements, a plurality of radially movable plungers, each disposed and operable substantially in a plane parallel to one of the clutch plates, means for translating a radial movement of said plungers, to an axial, clutch-engaging movement of one of the clutch plates; a plunger-actuating cam member movable axially of the clutch elements, and adapted for movement in either direction along their axis, and toward the plungers, the plungers being jointed to prevent their actuation responsively to movement of the cam thereto, in one direction.

7. In a clutch assembly including an axially movable member constituting one of the clutch elements, a plurality of toggle members adapted for movement toward centering position whereby to effect the axial movement of said clutch member, radial plungers engaging said toggle members, a shaft associated with the clutch, a control element movable along said shaft, a cam carried by the control element, having a recessed plunger-receiving seat and adapted upon a predetermined movement in either direction to effect a clutch-engaging movement of said plungers and toggle members, said recessed plunger seat tending to latch the cam and control element in clutch-engaging position.

8. In a friction clutch assembly, a driving element, a second driving element, a driven element between the driving elements, a hollow shaft by which the driven element is carried, a cylindrical housing carried by the hollow shaft and having radial passages therein, a passage transverse to each of said radial passages, toggle arms carried in said transverse passages, plungers in said radial passages, the hollow shaft being apertured transversely, to receive an inwardly projecting end of each of said plungers, the plungers being movable radially outwardly, to cause certain of said toggle arms to project from the cylindrical member and to bias the clutch elements toward each other into engaging position; a wearing ring rotatably disposed on one of the clutch elements for engagement by said projecting toggle arms, a clutch control member movable axially within said hollow shaft, the control member being characterized by portions of substantially reduced diameter and intervening portions of relatively enlarged diameter, the portions of differing diameter being connected by cam surfaces of graded diameter; said plungers being disposed in a plane, substantially centrally of said housing, and the said control member being movable through and beyond said plane, and adapted, upon predetermined movement in either direction with respect to said plane, to effect a clutch-engaging movement of said plungers.

9. In a friction clutch, a shiftable disc, a plurality of toggle arms arranged for clutch engagement and disengagement at substantially a right angle to said disc, a wearing ring rotatably carried by the disc, and arranged for detachable engagement by the toggle arms, the disc being provided with an annular channel in which the disc is seated and anti-friction members disposed in said channel between the wearing ring and disc.

10. In a friction clutch, an axially displaceable clutch element, a plurality of plungers disposed radially in a plane substantially parallel to said clutch element, means operatively connecting the plungers for actuating the clutch element upon their radial movement, a plunger-actuating member movable axially of the clutch for actuation thereof, and means jointedly connecting parts of each of said plungers.

11. In a friction clutch including an axially movable clutch disc, a plurality of disc-actuating toggles normal to said disc, control means for selectively centering the toggles, and a single spring element biasing one arm of each of said toggles, in a direction tending to cause engagement of the clutch.

12. In a clutch assembly for use with mechanism embodying a control element movable progressively into a plurality of control positions, a clutch actuating device including a plurality of radially arranged plungers having connection to a movable clutch part, the plungers being arranged in groups of differential length, a clutch control member adapted for actuation by said control element, and movable across the inner ends of said plungers, and circular cams carried by the clutch control member, the cams being of different sizes, conformable to the differences in length of the different groups of plungers.

13. In a friction clutch of disc type, including an axially displaceable disc, a plurality of radially arranged clutch-actuating plungers and mechanism coacting therewith for actuating said disc, a housing for said plungers forming guide passages therefor, the plungers and passageways being formed to direct the plungers along their axes through a portion of their paths, and to permit a lateral plunger movement over another portion of their paths, and means for biasing the plungers toward said displaceable disc, when in said last portion of their paths.

14. A clutch operated for clutching a hollow shaft having an aperture in its wall to an element rotatable on the shaft adjacent to the aperture, by means of an actuator movable in either direction in said shaft and mechanism rotating with said element for establishing operative relation of said actuator to the clutch, in which the mechanism comprises a member extending through the aperture and engaged by said actuator, establishing said operative relation, when the actuator is moved to said element in one direction, said member yielding, without establishing said relation, when the actuator is moved to said element in the other direction.

15. A clutch as set forth in claim 14 in which the actuator moves axially of the shaft and has an end part tapering from a middle part in at least one axial direction, and in which the engagement of the actuator with the member establishes the operative relation by wedging the member along said tapering end part onto the middle part, and in which said middle part and said member have mutually engaging surfaces to prevent yielding of said member and maintain the clutching relation, until said actuator is moved away from said element.

16. A clutch operated for clutching a shaft, having a device movable therein in either direction, to an element rotatable on the shaft, by means of mechanism comprising relatively yieldable members, in which the mechanism and said device comprise members having coaction to operate the mechanism when the device is moved relatively to the element in one direction, and to yield without operating said mechanism when the device is moved in the opposite direction, and in which the relatively yieldable members have mutually engaging surfaces preventing the yielding, to maintain the clutching relation, until the device is moved away from the element.

17. In a clutch assembly for use with mechanism embodying a control structure movable progressively into successive control positions, a plurality of clutch actuating plungers arranged and movable substantially in a plane adjacent the clutch, a guiding and housing structure for the plungers, a movable clutch-control shaft having connection with said control structure, a plurality of plunger-engaging elements carried in spaced relation on said shaft, and adapted to actuate said plungers in a predetermined sequence upon movement of the shaft in one direction, and means constituted by portions of the plungers adapted to cause a different sequence of operation of said plungers upon opposite movement of said shaft.

18. In a clutch assembly for use with mechanism embodying a control structure movable progressively into successive control positions, clutch actuating plungers each extending to a zone near the axis of rotation of the clutch elements, an axially movable clutch control shaft arranged along the axis of rotation of the clutch elements and disposed for actuation by said control structure, a series of plunger-actuating portions spaced along said shaft and operable into the said zone to provide a predetermined sequence of clutch engaging and disengaging movements upon a unidirectional movement of said shaft, each of the plungers being yieldably jointed, and adapted thereby to provide a sequence of clutch movements other than the reverse of said first named sequence, upon an opposite movement of said shaft.

19. A control assembly for a friction clutch of a type including an axially displaceable plate, the assembly including a plurality of control elements movable radially of the clutch axis, disposed in a plane substantially at a right angle to the axis of rotation of the clutch parts, means coacting with the radially movable elements upon outward radial movement thereof to translate such movement to an axial movement of the displaceable plate and cause engagement of the clutch; and a control shaft movable along the axis of rotation of the clutch, and having alternately arranged portions of different diameters, the portions of relatively larger diameter adapted for movement in either direction, with respect to the plane of said radially movable elements, to effect a clutch engaging movement thereof, and provided peripherally with recesses adapted to receive the inner ends of the radial elements, and a spring carried by each of the radial elements and tending to urge it toward a clutch disengaging position.

20. In a friction clutch assembly, a displaceable clutch element, an axially movable clutch-actuating element extending substantially along the axis of rotation of the clutch elements, a plurality of radially arranged plungers extended toward said axis for engagement by the actuating element, parts of the plungers being hingedly jointed to permit deflection as the clutch actuating element is moved in one direction, and means operatively connecting the plungers to the displaceable clutch element for purposes of clutch engagement and disengagement.

21. Actuating mechanism for a plate-type friction clutch, including a plurality of radially arranged and radially movable plungers disposed in a plane, and provided with sockets at their inner ends, actuating connections from the plungers to one of the clutch plates, serving to convert the radial plunger movement to a lateral plate movement, a circular cam disc movable laterally of itself into and out of radial-displacing relation with the plungers, the periphery of the cam being grooved, and a ball element carried by the socket of each plunger and adapted to move into and out of the groove of said cam, as the cam disc is brought into and away from the plane of the plungers.

EUGENE S. BUSH.